United States Patent [19]
Khokhar et al.

[11] Patent Number: 5,745,957
[45] Date of Patent: May 5, 1998

[54] IN-LINE CABLE TIE

[75] Inventors: Wasim Khokhar, Cordova, Tenn.;
Mark A. Bailey, Senatobia, Miss.

[73] Assignee: Thomas & Betts Corporation, Memphis, Tenn.

[21] Appl. No.: 824,428

[22] Filed: Mar. 26, 1997

[51] Int. Cl.[6] .................................................. B65D 63/00
[52] U.S. Cl. ................. 24/16 PB; 24/17 AP; 24/30.5 P
[58] Field of Search ..................... 24/16 PB, 17 AP, 24/30.5 P

[56] References Cited

U.S. PATENT DOCUMENTS

| | | |
|---|---|---|
| 3,735,448 | 5/1973 | Waddington . |
| 3,886,630 | 6/1975 | Emery ........................ 24/16 PB |
| 3,906,593 | 9/1975 | Caveney et al. . |
| 3,949,449 | 4/1976 | Caveney et al. . |
| 4,003,106 | 1/1977 | Schumacher et al. . |
| 4,136,148 | 1/1979 | Joyce ........................ 24/16 PB |
| 4,447,934 | 5/1984 | Anscher . |
| 4,507,828 | 4/1985 | Furutsu ........................ 4/16 PB |
| 5,414,904 | 5/1995 | Sampson ..................... 24/17 AP |

FOREIGN PATENT DOCUMENTS

| | | |
|---|---|---|
| 0 035 368 | 9/1981 | European Pat. Off. . |
| 0 090 726 | 5/1983 | European Pat. Off. . |
| 2 502 265 | 9/1982 | France . |
| 1 418 900 | 12/1975 | United Kingdom . |
| 1 519 233 | 7/1978 | United Kingdom . |
| 2 040 352 | 8/1980 | United Kingdom . |
| 2 037 869 | 10/1982 | United Kingdom . |

OTHER PUBLICATIONS

Panduit Electrical Group Catalog, Section A, p. 8, Nov. 5, 1993.

*Primary Examiner*—Victor N. Sakran
*Attorney, Agent, or Firm*—Hoffmann & Baron, LLP

[57] ABSTRACT

A cable tie includes an elongate generally planar strap and a head. The head includes a passageway therethrough for inserting the strap and a flexibly hinged locking pawl adjacent the passageway. The cable tie resists longitudinal deformation of the locking notches when adjacent the locking teeth on the pawl. Side edge-barriers are located along the strap adjacent the head so that the strap may be cut at a location between the side edge-barriers.

9 Claims, 4 Drawing Sheets

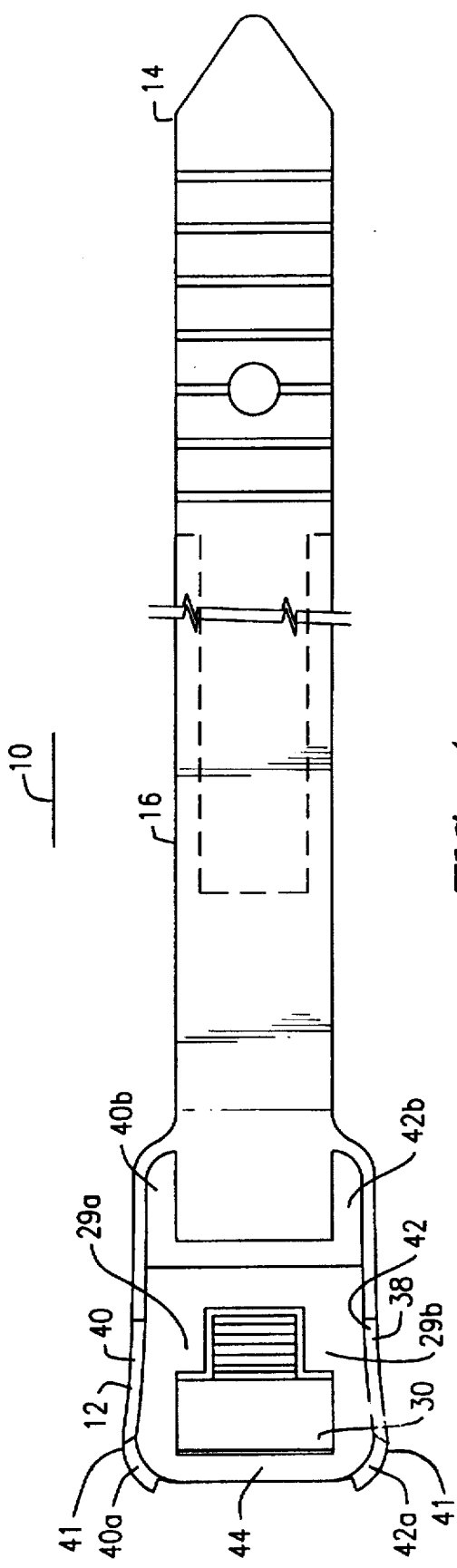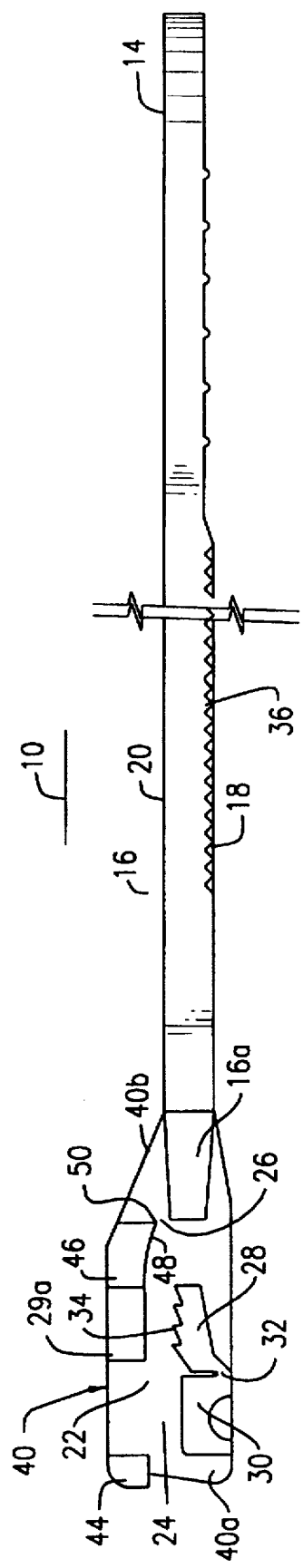

IN-LINE CABLE TIE

FIELD OF THE INVENTION

The present invention relates to cable ties used to bundle an article or a group of articles. More specifically, the present invention relates to parallel-entry cable ties having a passageway through the head of the cable tie in a direction substantially parallel to the strap body.

BACKGROUND OF THE INVENTION

The use of cable ties to bundle or secure a group of articles is well known. Known cable ties of conventional construction are elongate members having a head at one end, a tail at the other end, and a longitudinal strap therebetween. The strap is wrapped around a bundle of articles and the tail is inserted through an aperture or passageway in the head. The head of the cable tie typically includes a locking element which is engagable with the body of the strap so that when the tail is pulled through the passageway in the head, the locking element secures the strap body in the head. Some cable ties, for example as disclosed in U.S. Pat. No. 3,886,630, provide an passageway through the head in a direction substantially parallel to the strap body. These cable ties may generally have a lower profile than the more conventional orthogonal-entry cable ties, such as is disclosed in U.S. Pat. No. 3,965,538.

With so-called one piece cable ties, the head includes a flexibly mounted pawl which is deflected by the strap when the strap is inserted through the passageway in the head. Both the pawl and the surface of the strap which the pawl engages typically include transverse locking teeth which interact when the forces applied to the strap attempt to withdraw the strap back out of the head. Upon application of such withdrawal forces, the transverse locking teeth on the pawl engage the transverse locking teeth on the strap to prevent the strap from being withdrawn from the head in a direction opposite to the insertion direction.

However, when insertion forces are applied to the tail of the cable tie, or to that portion of the strap which has been inserted through the head and now protrudes from the passageway, the strap body will stretch to a certain extent. Stretching of the strap body thereby causes the transverse locking teeth on the strap body to be spaced further apart so that their interaction with the unstretched transverse locking teeth on the pawl may be adversely affected. The withdrawal forces acting on the strap would be transferred to less of the transverse locking teeth on the pawl as the alignment of the teeth on the strap has been disturbed. There is a higher likelihood of the pawl failing to retain the strap or preventing slippage of strap in the withdrawal direction thereby resulting in a less secure bundling.

It is also known in the art to provide tools which perform the functions of pulling the tail and strap through the head. Some tools also include the capability of cutting-off a portion of the tail and strap which exits out from the passageway in the head. Such tools, however, result in exposed sharp edges at the truncated end of the strap exiting the head. The sharp edges on the truncated end of the strap pose a hazard to those handling the bundled articles.

The passageway through the head of the cable ties may be substantially parallel to the longitudinal axis of the strap body. Some cable ties, such those disclosed in U.S. Pat. Nos. 4,272,047 and 4,631,782, position a flexible pawl the head so that the passageway is between the pawl and the articles to be bundled. When the cable tie is assembled, the pawl is accessible and may be disengaged from the inserted strap. Such cable ties are therefore not tamper-proof as the pawl will be accessible and the bundle of articles may be released from the cable tie.

It is therefore desirable to provide a cable tie which can overcome the above-noted deficiencies in the prior art.

SUMMARY OF THE INVENTION

It is an object of the present invention to provide a cable tie having a low profile.

It is another object of the present invention to provide a cable tie that, once assembled, may have excess strap severed therefrom such that the cut edges of the strap thereby resulting are sheltered by the cable tie.

It is still another object of the present invention to provide a cable tie having a tamper-proof locking mechanism.

It is yet another object of the present invention to provide a cable tie that will minimize the stretching of the strap within the head when the portion of the strap exiting out the head is pulled in an insertion direction for the cable tie.

In the efficient attainment of these and other objects, the present invention provides a bundling tie including an elongate strap body and a head having an passageway therethrough for insertably accommodating the strap body. A flexible pawl is located within the head that deflects to allow the strap body to be inserted though the head in an insertion direction and that engages the strap body to prevent the strap from being withdrawn from the head in a direction opposite the insertion direction. The head also includes a surface flaring into the passageway to engage the inserted strap so as to minimize strap stretching in the vicinity of the pawl when a portion of the strap body extending through the head is pulled in a strap insertion direction. The head also provides side walls extending down the length of the strap body adjacent the head between which the excess strap exiting the head may be severed

BRIEF DESCRIPTION OF THE DRAWINGS

FIG. 1 shows a top plan view of a cable tie of the present invention.

FIG. 2 is a side sectional view of the cable tie of FIG. 1.

DETAILED DESCRIPTION OF THE PREFERRED EMBODIMENT

Figure 3:
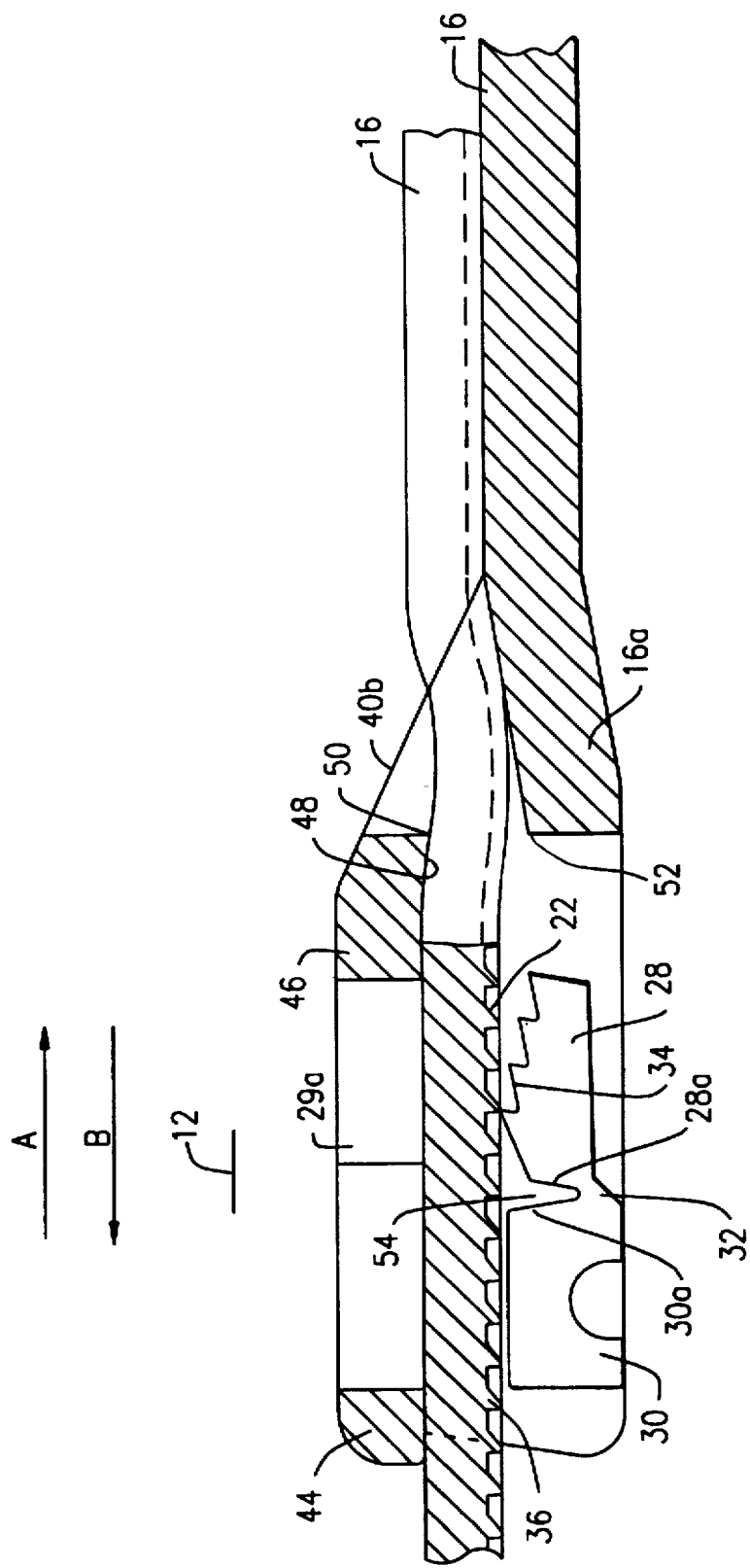
FIG. 3 is a side sectional view of the cable tie of FIG. 1 as the strap body is being inserted through the head.

FIGS. 1–5 show a cable tie 10 of the present invention. With reference to FIGS. 1 and 2, cable tie 10 is an elongate member including a head 12, an opposed tail 14, and an elongate strap body 16 therebetween. Strap body 16 is typically planar shaped having first and second opposed major surface 18 and 20. Head 12 includes passageway 22 therethrough. Passageway 22 includes strap ingress end 24 and strap egress end 26. Head 12 also includes a flexibly mounted rigid locking pawl 28 adjacent passageway 22 across from detents 29a and 29b. Locking pawl 28 is connected to shoulder 30 by a flexible hinge 32. Locking pawl 28 also includes a plurality of transverse locking teeth 34 which engage the transverse locking notches 36 provided on major surface 18 of strap body 16 when inserted through passageway 22 of head 12.

Head 12 may be described as having a boundary wall 38 which includes side walls 40, 42 and rear brace 44. Side walls 40 and 42 include distal ends 40a and 42a respectively, adjacent the strap ingress end 24, and proximal ends 40b and 42b respectively, adjacent strap egress end 26. Strap body end 16a extends between the proximal ends 40b and 42b of side walls 40 and 42. Rear brace 44 spans between proximal ends 40a and 42a in flush edge relationship therewith and defines the upper limit of strap ingress end 24 of passageway 22. Front brace 46 spans between side walls 40 and 42 in flush edge relationship therewith and adjacent proximal ends 40b and 42b. Front brace 46 includes flared surface 48 which terminates in edge 50. Edge 50 defines the upper limit of strap egress end 26 of passageway 22. The top transverse edge 52 of end 16a defines the lower limit of strap egress end 26 of passageway 22.

Shoulder 30 spans between side walls 40 and 42 adjacent distal ends 40a and 42a and defines the lower extent of passageway 22. As seen in FIG. 2, locking pawl 28 is flexibly connected to shoulder 30 by flexible hinge 32. Flexible hinge 32 defines the closed end of a transverse notch 54 between locking pawl 28 and shoulder 30. Transverse notch 54 opens towards passageway 22. In an undeflected position, locking pawl 28 protrudes into passageway 22.

Figure 4:
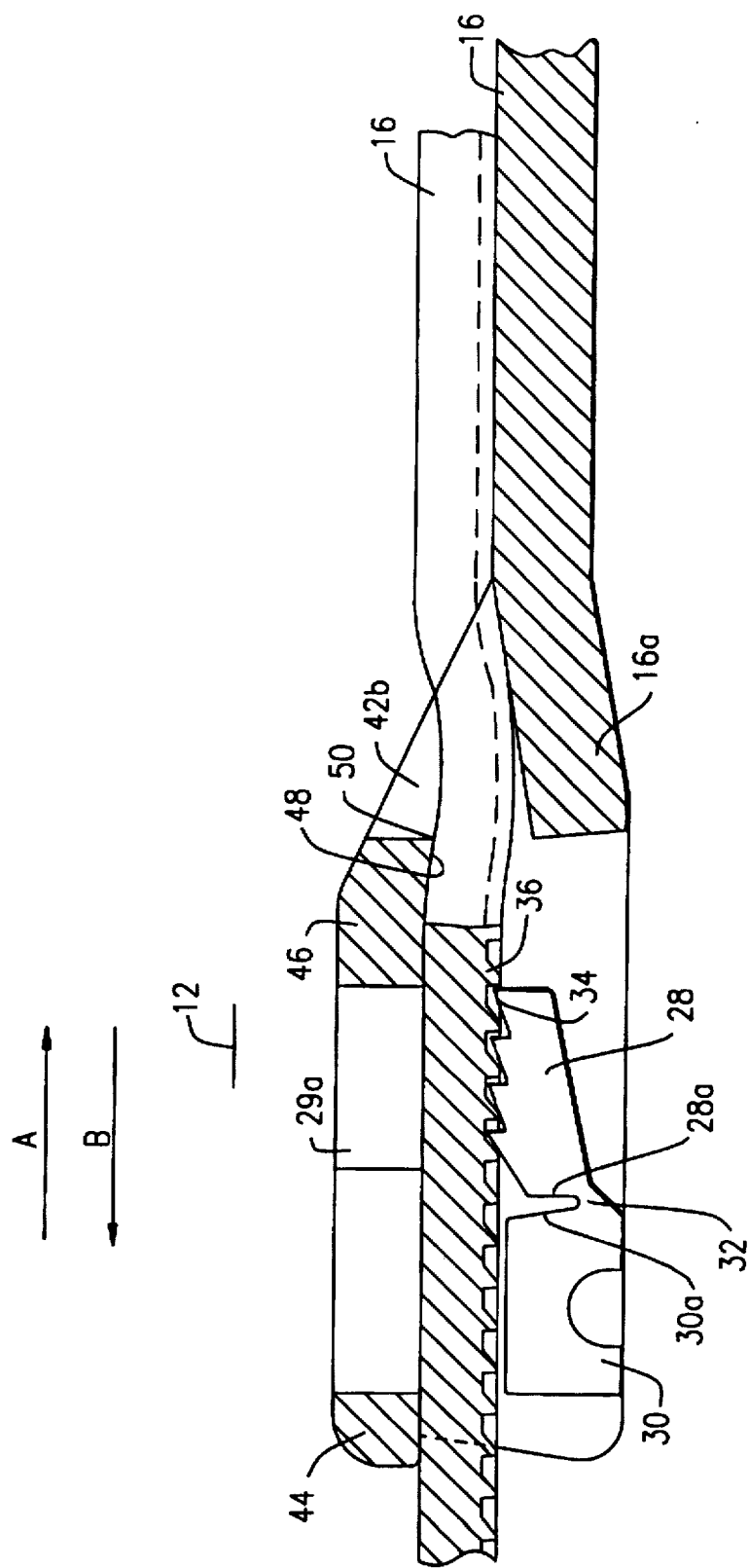
FIG. 4 is a sectional view of the cable tie of FIG. 1 as the insertion force is relaxed.
Figure 5:
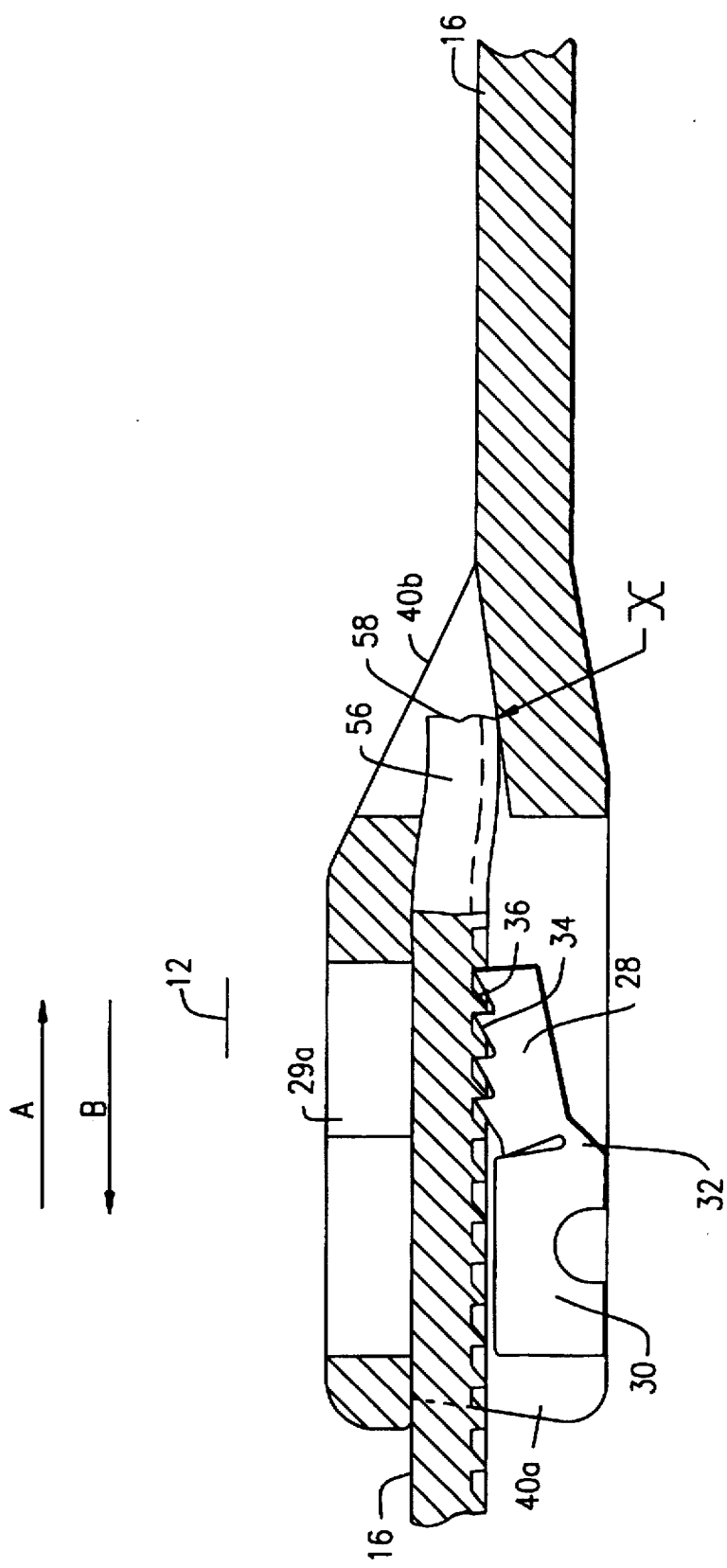
FIG. 5 is a sectional view of the cable tie of FIG. 1 after the excess strap has been severed.

As shown in FIG. 3, the insertion of tail 14 and strap body 16 through passageway 22 in the direction of arrow A causes locking pawl 28 to pivot away from passageway 22 so that tail 14 and strap body 16 may pass through head 12. As is known in the art, the pivoting of locking pawl 28 actually includes a combination of rotation and deflection about hinge 28. With reference to FIG. 4, when withdrawal forces acting in the direction of arrow B are applied to strap body 16, pawl locking teeth 34 engage locking notches 36 on strap body 16. Locking pawl 28 will pivot in a direction opposite to the insertion pivot direction until pawl surface 28a abuts against shoulder surface 30a as shown in FIG. 5. Strap body 16 is forced against detents 29a and 29b by locking pawl 28.

Flared surface 48 and edge 50 extend slightly into passageway 22. After strap body 16 is inserted through passageway 22 past locking pawl 28, flared surface 48 and edge 50 force major surface 20 of strap body 16 against top transverse edge 52 of end 16a. When forces in the direction of arrow A are applied to that portion of the strap body that protrudes from passageway 22, flared surface 48 and edge thereby frictionally grip major surface 20 of strap body 16. By applying this resistance, flared surface 48 minimizes the stretching of strap body 16 within head 12 due to the application of insertion forces in the direction of arrow A. As a result, the longitudinal deflection of locking notches 36 on major surface 20 of strap body 16 is also minimized so that the alignment between locking notches 36 and pawl locking teeth 34 is better maintained.

As is seen in FIG. 1, side walls 40 and 42 preferably include external dimensions that provide a slight taper away from each other at distal ends 40a and 42a so as to form a bulge 41. Bulge 41 provides a cable tie installer with a better grip of head 12 when passing strap body 16 through passageway 22. Bulge 41 also allows the installer to apply a force to head 12 in the direction of arrow B to counter the strap insertion force in the direction of arrow A.

In conventional operation known for cable ties, tail 14 is wrapped around a bundle of articles and inserted in the direction of arrow A into strap ingress end 24 of passageway 22 20 through head 12. Tail 14 extends through passageway 22, exiting head 12 through strap egress end 26. As the strap is similarly pulled through passageway 22, locking pawl 28 is rotated and deflected about flexible hinge 32 in a direction away from the inserted strap body, as shown in FIG. 3. Tail 14 is pulled through head 12 until the cable tie tightly encircles the bundle of articles. As the encirclement of the bundle of articles grows tighter, continued pulling on tail 14 in the direction of arrow A causes tail 14 and strap body 16 to longitudinally expand in the direction of arrow A. The engagement by flared surface 48 of major surface 18 of strap body 16 provides resistance to the continued pulling on tail 14 and thereby limits the longitudinal expansion of strap body 16 within head 12. While the portion of strap body 16 protruding from head 12 remains subject to the full tensile load of the continued pulling of tail 14, the portion of strap body 16 within head 12 will be subject to a lesser tensile load so that the longitudinal expansion of locking notches 36 about pawl locking teeth 34 will be minimized.

It is contemplated that the portion of tail 14 and strap body 16 protruding from head 12 may be engaged and pulled on by a tool (not shown) used for tightening cable ties as is known in the prior art. The tool, once cable tie 10 is secured about the bundle of articles, can also sever the portion of strap body 16 protruding from head 12 at location X between proximal ends 40b and 42b of side walls 40 and 42 respectively. As shown in FIG. 5, severing of strap body 16 results in severed end 56 having severed perimetrical edge 58. Proximal ends 40b and 42b serve as a pair of strap edge-barriers by extending beyond location X sufficiently to maintain severed perimetrical edge 58 therebetween and to obviate hazards posed by the severed perimetrical edge 58.

The release or severing of strap body 16 results in forces acting in the direction of arrow B to recoil strap body 16 across locking pawl 28 and around the bundle of articles. Such a recoiling force causes pawl locking teeth 34 to engage locking notches 36 on strap body 16 so that locking pawl 28 is caused to counter-rotate and deflect back towards strap body 16. Locking pawl 28 will continue to counter-rotate until pawl surface 28 abuts against shoulder surface 30a. The positioning of locking pawl 28 between the bundle of articles and strap body 16 and side walls 40 and 42 provides a tamper-proof locking engagement between locking pawl 28 and strap body 16 so that the bundle of articles remains bound by cable tie 10.

The present invention therefore provides a low profile cable tie having a tamper-proof locking pawl. Further, the cable tie of the present invention is able to minimize the stretching of the locking notches of the strap body when adjacent to the locking pawl. The cable tie of the present invention also conceals the edges formed by cutting the excess length of strap body that protrudes from the head.

While the particular preferred embodiment of the present invention has been shown and described, it will be obvious to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A low profile bundling tie for bundling a number of articles comprising:

an elongate strap having a locking head at one end and a tail at the other end;

said elongate strap including two opposing major surfaces, one of said opposing major surfaces having transverse locking notches disposed thereon;

said head having a passageway therethrough for insertably accommodating said strap;

said passageway including a strap ingress end and a strap egress end, said strap egress end being located proximal to said elongate strap, said egress end including a transverse surface flaring into said passageway;

said head further including a flexible locking pawl supported by said head within said passageway, said locking pawl including transverse locking teeth formed to engage the locking notches disposed on said one major surface of said strap; and wherein said flaring transverse surface frictionally grips a section of the strap that has been inserted past the locking pawl and thereby minimizes stretching of the strap about the pawl by forces pulling, in an insertion direction, on that portion of the strap exiting said head through said egress end.

2. The bundling tie of claim 1 wherein said flexible locking pawl is connected to said head by a shoulder having a flexible hinge, said hinge defining the closed end of a notch formed between said pawl and said shoulder, said notch opening in a direction facing said passageway, said pawl being deflectable to permit movement of said strap in an insertion direction, said pawl also being rigid to lockingly engage said strap and to prevent substantial movement of said strap in a withdrawal direction opposite said insertion direction.

3. The bundling tie of claim 1 wherein the flexible locking pawl is positioned between the articles and the strap when the strap is inserted through the passageway in the head.

4. The bundling tie of claim 1 further including a pair of strap edge-barriers adjacent said strap egress end of said passageway, wherein a portion of the strap exiting the head through said egress end may be cut-away from the bundling tie at a location between said pair of edge barriers.

5. The bundling tie of claim 1 wherein said head includes tapering side walls on opposed transversely spaced surfaces, said tapering side walls forming a bulge to aid in handling said bundling tie.

6. A bundling tie for bundling a number of articles comprising:

an elongate strap having a head at one end and a tail at the other end, said head including a passageway therethrough for insertably accommodating said tail and said strap;

said strap including two opposed major surfaces, one of said major surfaces having a plurality of transverse notches;

said head further comprising a pair of transversely-spaced side walls, said pair of sidewalls including opposed top and bottom edges, each of said top edges having a first end and an opposing second end, a first transverse brace spans between the first ends of said top edges and a second transverse brace spans between the second ends of said top edges;

said second transverse brace, said side walls and said strap further defining a strap egress end of said passageway, said second transverse brace including a surface flaring towards the center of said passageway that frictionally grips said strap inserted through the head so as to minimize longitudinal stretching of the strap within the head when a portion of said strap extending out through said egress end is pulled in the insertion direction; and said head further supporting a pawl therein, said pawl being movable upon insertion of said strap in an insertion direction, said pawl having a plurality of transverse teeth for locking engagement with said notches on said one major surface of said strap upon attempted withdrawal of an inserted strap in a direction opposite said insertion direction.

7. A bundling tie as claimed in claim 6 wherein said side walls adjacent said strap egress end extend along said strap so that said portion of said strap extending out through said egress end may be severed at a location between said sidewalls.

8. The bundling tie of claim 6 wherein said flexible locking pawl is supported by a shoulder having a flexible hinge, said hinge defining the closed end of a notch formed between said pawl and said shoulder, said notch opening in a direction facing said passageway, said pawl being deflectable to permit movement of said strap in an insertion direction, said pawl also being rigid to lockingly engage said strap and to prevent substantial movement of said strap in a withdrawal direction opposite said insertion direction.

9. A bundling tie of claim 6 wherein said pawl is positioned within the head so as to be located between the articles and the strap when the strap is inserted through the passageway in the head.

* * * * *

UNITED STATES PATENT AND TRADEMARK OFFICE
CERTIFICATE OF CORRECTION

PATENT NO. : 5,745,957
DATED : May 5, 1998
INVENTOR(S) : Khokhar, et al.

It is certified that error appears in the above-identified patent and that said Letters Patent is hereby corrected as shown below:

Column 3, Line 66,          now reads "end 24 passageway 22 20 through",
should read --end 24 of passageway 22 through--.

Signed and Sealed this

Twenty-eighth Day of July, 1998

Attest:

BRUCE LEHMAN

Attesting Officer          Commissioner of Patents and Trademarks